(No Model.) 3 Sheets—Sheet 1.

H. SEMPLE & A. P. AYLING.
REVOLVING GLASS CASTER.

No. 290,804. Patented Dec. 25, 1883.

Witnesses
W. B. Corwin
Jno. K. Smith

Inventors
Harry Semple
Arthur P. Ayling
by their attys
Bakewell & Kerr (No Model.) 3 Sheets—Sheet 2.

H. SEMPLE & A. P. AYLING.
REVOLVING GLASS CASTER.

No. 290,804. Patented Dec. 25, 1883.

Witnesses
W. B. Corwin
Jno. K. Smith

Inventors
Harry Semple
Arthur P. Ayling
by their attys
Bakewell & Kerr (No Model.) 3 Sheets—Sheet 3.

H. SEMPLE & A. P. AYLING.
REVOLVING GLASS CASTER.

No. 290,804. Patented Dec. 25, 1883.

UNITED STATES PATENT OFFICE.

HARRY SEMPLE AND ARTHUR P. AYLING, OF WELLSBURG, W. VA.

REVOLVING GLASS CASTER.

SPECIFICATION forming part of Letters Patent No. 290,804, dated December 25, 1883.

Application filed November 5, 1883. (No model.)

*To all whom it may concern:*

Be it known that we, HARRY SEMPLE and ARTHUR P. AYLING, of Wellsburg, in the county of Brooke and State of West Virginia, have invented a new and useful Improvement in Revolving Glass Casters; and we do hereby declare the following to be a full, clear, and exact description thereof, reference being had to the accompanying drawings, forming a part of this specification, in which—

Figure 1:
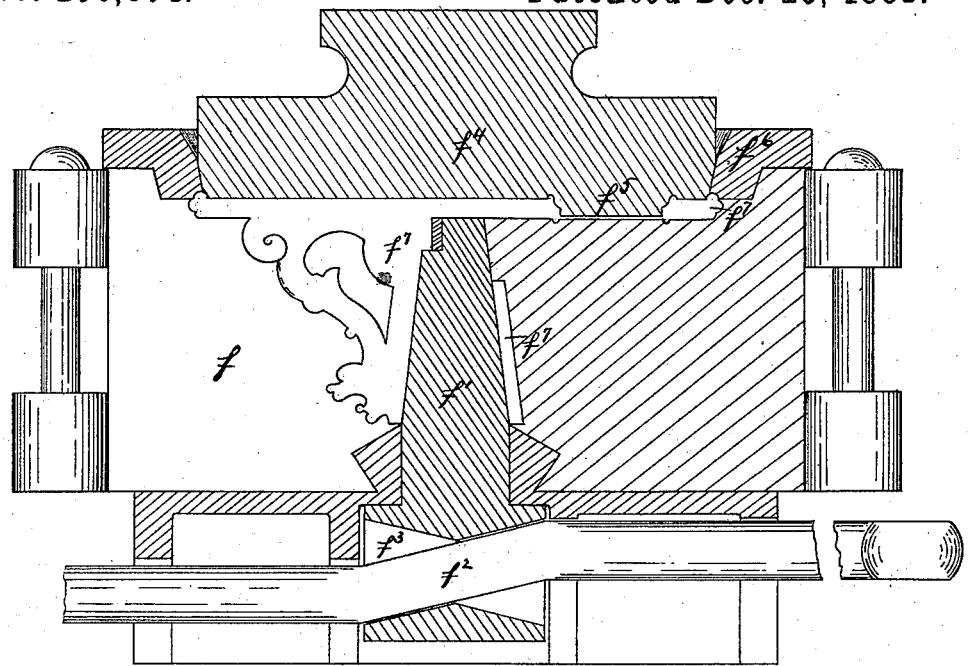
Figure 2:
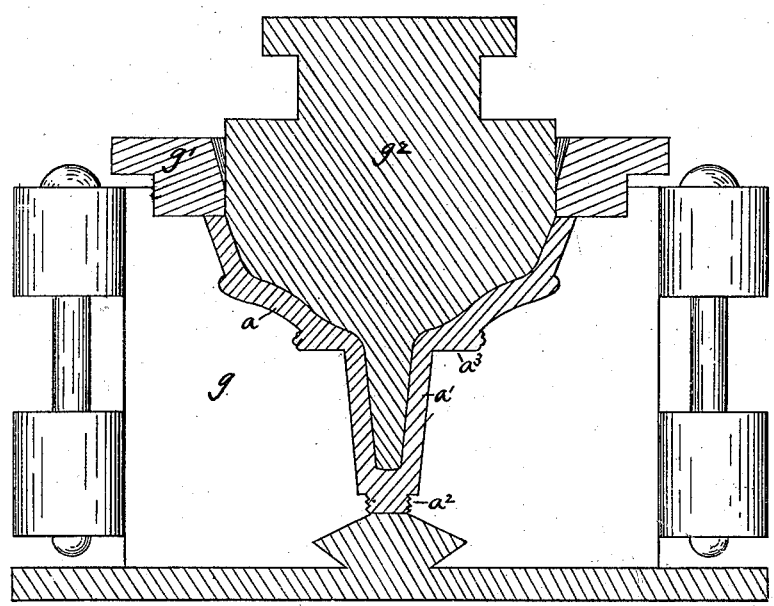
Figure 3:
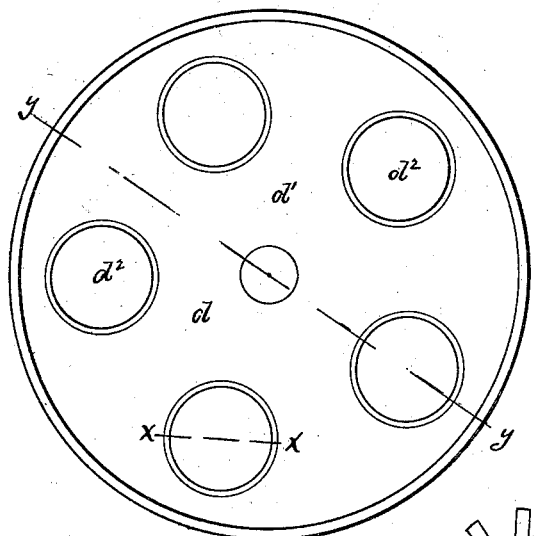
Figure 4:
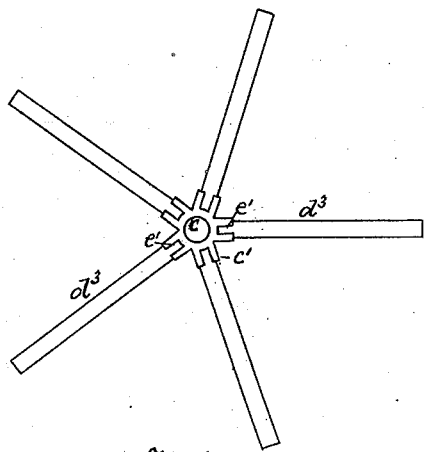
Figure 5:
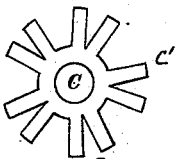
Figure 9:
Figure 6:
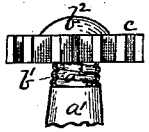
Figures 7, 8:
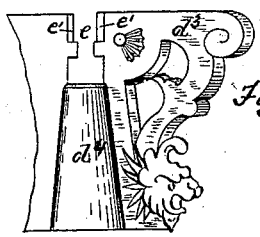
Figure 10:
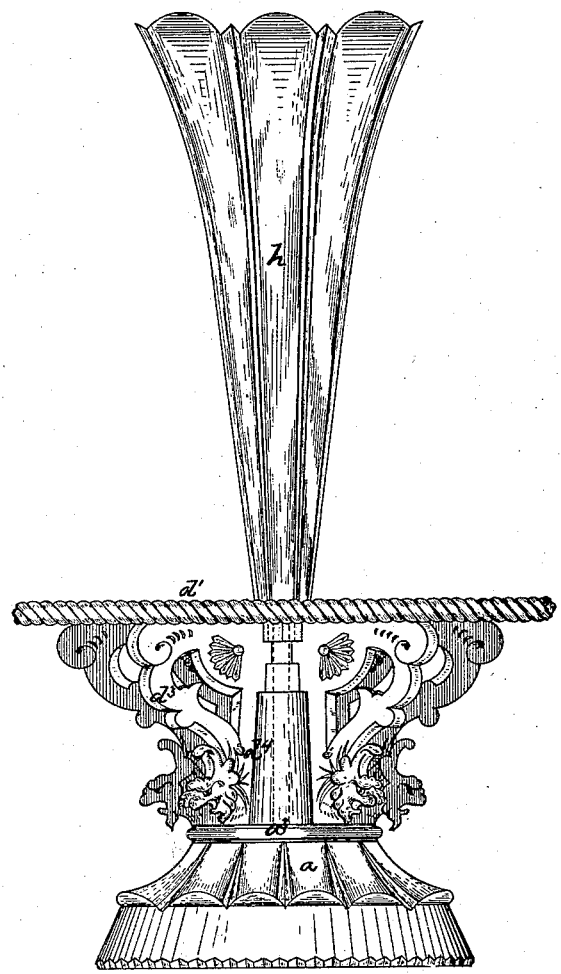

Figure 1 is a sectional view of the mold for forming the revolving plate or disk which receives and holds the caster-bottles. Fig. 2 is a view of one-half the mold for forming the stem and foot. Fig. 3 is a plan view of the revolving plate. Fig. 4 is a section of the revolving portion just below the plate, showing the wings or brackets. Fig. 5 is a plan view of the metallic fitting or collar upon which the caster-holder revolves on the stem. Fig. 6 is a side elevation of the upper end of the stem, showing the fitting in place. Fig. 7 is a view of the stem without the collar. Fig. 8 is a side elevation of a portion of Fig. 4. Fig. 9 is a section on the line $x\ x$ of Fig. 3. Fig. 10 is a side elevation of the caster-stand plate without the bottles.

The object of our improvement is the production of a glass caster-stand having a revolving bottle-holder.

Like letters of reference indicate like parts in each.

The article has a stand composed of the foot $a$, provided with a stem, $a'$, the upper end of which has a threaded peg, $a^2$. In connection with the stem we use a metallic piece, $b$, having a threaded collar or socket-piece, $b'$, and a headed rivet, $b^2$, between the head of which and the socket $b'$ is secured a metallic collar, $c$, capable of revolving or turning on the stem of the rivet. The collar $c$ has projections or wings $c'$, which, being formed of soft metal, are capable of being clinched into suitable recesses in the wings or standing brackets of the revolving bottle-holder, so as to connect the holder with the collar $c$, to enable the parts to turn on the stem. The revolving bottle-holder $d$ consists of the plate or disk $d'$, in which are bottle-holders $d^2$, wings or standing brackets $d^3$, and a tubular stem, $d^4$. The wings are integral with the plate $d'$ and the stem $d^4$, and extend vertically between the holes $d^2$. The stem $d^4$ does not extend up to the plate $d'$, but between them is a space, $e$, where the inner edges of the radiating wings $d^3$ are not connected. Here the sides of the wings are notched or recessed, as at $e'$, Figs. 4 and 8, to receive the wings $c'$ of the collar $c$. The stem $a'$ is provided with a screw-threaded peg, $a^2$, and the foot $a$ with a flat surface, $a^3$.

In putting the parts together, the collar $c$ is first riveted to the fitting $b$, and the latter screwed onto the plug $a^2$. Then the stem $a'$ is inserted into the hollow stem $d^4$, the wings $c'$ coming into proper position in the space $e$ to be clinched into the recesses $e'$. When the stand $a$ and holder $d$ are thus united, the lower ends of the hollow stem $d^4$ and wings $d^3$ are intended to rest upon the flat surface $a^3$, and the holder $d$ is free to turn on the stand, the upper part being supported by the collar $c$, which turns on the rivet $b^2$, and the hollow stem $d^4$, which is free to turn on the stem $a'$, acting as a hub.

The holder $d$, which consists of the disk $d'$, brackets $d^3$, and tubular stem $d^4$, is formed in one piece in the mold $f$. (Shown in Fig. 1.) This mold is made in five parts, to suit the number of brackets or wings $d^3$, a joint being necessary at each bracket to permit the withdrawal of the article from the mold, as will be readily understood by those skilled in the art.

Extending up from the bottom is a removable plug, $f'$, which forms the hollow stem $d^4$. This plug is operated by the incline or wedge-piece or bar $f^2$, which works through the opening $f^3$ in the base of the plug, and raises or lowers it in the mold by acting on the inclined surfaces of the opening $f^3$. The plug $f'$ is raised to place before the glass is put in the mold, and is dropped after the article is pressed, to prevent it sticking thereon and to free it from the mold. In connection with the mold is a suitable plunger, $f^4$, having projections $f^5$, for forming the bottle-openings in the plate or disk $d'$. There is also a mold-ring, $f^6$, through which the plunger $f^4$ works. The mold-cavity is seen at $f^7$. The holder $d$ is pressed in the mold $f$ in the usual way. The view in Fig. 1 is through that portion of the mold which would correspond to the line $y\ y$ on Fig. 3, said line indicating a vertical plane which would pass between two of the mold-sections on one side of the center and bisect one of the sections on the other. The stand $a$ is formed in a two-part mold, $g$, Fig. 2, provided with a suitable mold-ring, $g'$, and plunger $g^2$. The holder $d$ may be made to hold a less or greater number of bottles. The number of brackets or wings $d^3$ should preferably correspond to the number of bottle-holes, so as to alternate therewith; but this is not essential. The number of sections of the mold $f$ will correspond to the number of brackets $d^3$, unless the latter are so shaped as to be capable of withdrawal from the mold without opening it, in which case joints in the mold for this purpose are not necessary. The bottle-holes $d^2$ are pressed with a seat, $d^5$, Fig. 9, to receive a ring or gasket, $d^6$, of india-rubber or other suitable packing material, to receive the bottle and prevent the disk $d'$ or the edges of the bottle-holes from being broken or chipped by the bottle when the latter is carelessly or rudely put in place. When it is desired to add a celery or flower holder or ornamental centerpiece, such as is shown at $h$ in Fig. 10, it is done by forming the same separately and then welding or sticking it on by means of a piece of hot glass, as will be readily understood.

Having thus described the method and apparatus for making the different parts of our improved revolving glass caster, and the way of uniting them, we desire to state that we do not limit our claims for the article to such means and apparatus for making the same, however novel the same may be, but that we claim, broadly, such an article, regardless of how or by what means it may be made.

We do not herein claim the method and apparatus for making our improved caster, but reserve the right to make them the subject-matter of a separate application.

The caster is much handsomer, cheaper, more easily kept clean, and generally more desirable than revolving metal casters.

We believe that we are the first to invent a revolving glass caster.

What we claim as our invention, and desire to secure by Letters Patent, is—

1. A caster having a revolving glass bottle-holder, substantially as described.

2. A caster having a revolving glass bottle-holder and a glass stand or pedestal, substantially as and for the purposes described.

3. A caster having a glass pedestal provided with a headed stem, and a revolving bottle-holder provided with a central metallic collar fitting and capable of turning on the stem of the pedestal, substantially as and for the purposes described.

4. The combination, in a caster, of a glass pedestal having a stem with a revolving glass bottle-holder, having a hollow stem or hub fitting over the pedestal-stem and revolving thereon, substantially as and for the purposes described.

5. A glass caster having a glass pedestal, a revolving glass bottle-holder, and a central glass vase or celery-holder, substantially as and for the purposes described.

6. A glass caster having the bottle-holes provided with a packing or gasket, substantially as and for the purposes described.

In testimony whereof we have hereunto set our hands this 31st day of October, A. D. 1883.

HARRY SEMPLE.
ARTHUR P. AYLING.

Witnesses:
THOS. T. MCCANN,
CHAS. E. BLUE.